United States Patent [19]

Wolf

[11] Patent Number: 5,600,660
[45] Date of Patent: Feb. 4, 1997

[54] METHOD FOR DETERMINING THE NUMBER OF DEFECTIVE DIGITAL BITS (DEFECTIVE BIT NUMBER) TRANSMITTED OVER A DATA-TRANSMISSION PATH TO BE TESTED, AND DEVICE FOR THE CARRYING OUT OF THE METHOD

[75] Inventor: Andreas Wolf, Berlin, Germany

[73] Assignee: Siemens Aktiengesellschaft, Munich, Germany

[21] Appl. No.: 290,916

[22] PCT Filed: Feb. 3, 1993

[86] PCT No.: PCT/DE93/00108

§ 371 Date: Oct. 18, 1994

§ 102(e) Date: Oct. 18, 1994

[87] PCT Pub. No.: WO93/17511

PCT Pub. Date: Sep. 2, 1993

[30] Foreign Application Priority Data

Feb. 21, 1992 [DE] Germany ............................ 42 05 776.0

[51] Int. Cl.⁶ ........................... H03M 13/00; G06F 11/00
[52] U.S. Cl. ............................. 371/377; 371/3; 371/27; 371/48; 375/224
[58] Field of Search ............................ 371/3, 5.1, 5.2, 371/8.2, 20.1, 24, 27, 37.6, 37.7; 375/206, 209, 210, 224, 367; 455/67.1, 67.2, 67.7; 364/728.03, 728.04, 728.05, 728.07

[56] References Cited

U.S. PATENT DOCUMENTS

| | | | |
|---|---|---|---|
| 3,622,877 | 11/1971 | MacDavid et al. | 375/222 |
| 4,653,076 | 3/1987 | Jerrim | 375/367 |
| 4,654,814 | 3/1987 | Sebald et al. | 364/604 |
| 4,710,932 | 12/1987 | Hiroshi et al. | 371/25.1 |
| 5,166,664 | 11/1992 | Fish | 340/539 |

FOREIGN PATENT DOCUMENTS

| | | |
|---|---|---|
| 4012850 | 10/1991 | Germany. |
| 4014767 | 11/1991 | Germany. |

OTHER PUBLICATIONS

"Bit Errors – Structural Analysis in Broadband–ISDN–Measuring Technology", by Wolf et al., NTZ, vol. 44, Nr. 8, 1991, Berlin, DE, pp. 548–557.

"Measuring Precision on Broad Band", by Wolf, Telecom Report vol. 14, Nr. 2, 1991 pp. 104–107.

"The ISDN–Basic Access", by Seidel, Telecom Report, vol. 10, 1987, Erlangen, DE pp. 166–172.

"On Generation and Measurement of Combined Barker Codes", by El–Khamy, International Journal of Electronics, vol. 50 Nr. 6, 1981, London, GB, pp. 429–436.

"On Generation and Correlation Measurement of Gold Codes", by El–Khamy, International Journal of Electronics, vol. 64, Nr. 3, 1988, London, DE pp. 481–492.

"On the Partial–Period Correlation Moments of GMW Sequences", by Kumer et al, IEEE Military Communications Conference, vol. 2, 1987, Washington, US, pp. 738–741.

Primary Examiner—Paul P. Gordon
Assistant Examiner—Emmanuel L. Moise
Attorney, Agent, or Firm—Kenyon & Kenyon

[57] ABSTRACT

A data transmission path, which is to be tested, has an input end provided with a digital test sequence. An output sequence, received on an output end of the data-transmission path, is correlated with a reference sequence corresponding to the test sequence by performing a cyclically bit-wise shifted exclusive-OR operation followed by forming a check-sum to form a binary cross-correlation. The low-order positions of an extreme value (i.e., minimum or maximum) of the cross-correlation function, directly indicate the number of defective bits in the output sequence.

5 Claims, 3 Drawing Sheets

| Decimal $KKF_d(n)$ Value | Binary $KKF_d(n)$ Value | Inverted Binary Value | Number of Defective Bits BF |
|---|---|---|---|
| 0 | 00000= | | 0 |
| 1 | 00001= | | 1 |
| 2 | 00010= | | 2 |
| 3 | 00011= | | 3 |
| 4 | 00100= | | 4 |
| | | | |
| | | | |
| | | | |
| 27 | 11011 | 00100= | 4 |
| 28 | 11100 | 00011= | 3 |
| 29 | 11101 | 00010= | 2 |
| 30 | 11110 | 00001= | 1 |
| 31 | 11111 | 00000= | 0 |

| TEST SEQUENCE | a<br>A | b<br>A | c<br>A | d<br>A | e<br>A | f<br>A | g<br>A | h<br>A |
|---|---|---|---|---|---|---|---|---|
| REFERENCE SEQUENCE | R(A) | R(A) | R(A) | R(A) | R(A) | R(A) | R(A) | R(A) |
| OPERATION | EXOR | EXOR | EXNOR | EXNOR | EXOR | EXOR | EXNOR | EXNOR |
| EXTREME VALUE/<br>MAXIMUM/MINIMUM<br>CHECK-SUM Q WITH<br>ONE DEFECTIVE BIT | 1 | MAX-1 | MAX-1 | 1 | MAX-1 | 1 | 1 | MAX-1 |
| INVERSION | / | YES | YES | / | YES | / | / | YES |
| DISPLAY (LOW-ORDER POSITION OF THE EXTREME VALUE) | Q | $\overline{Q}$ | $\overline{Q}$ | Q | $\overline{Q}$ | Q | Q | $\overline{Q}$ |

FIG. 3

METHOD FOR DETERMINING THE NUMBER OF DEFECTIVE DIGITAL BITS (DEFECTIVE BIT NUMBER) TRANSMITTED OVER A DATA-TRANSMISSION PATH TO BE TESTED, AND DEVICE FOR THE CARRYING OUT OF THE METHOD

BACKGROUND OF THE INVENTION

The present invention relates to a method for determining the number of defective digital bits (defective bit number) of the sequence that has been transmitted over a data-transmission path to be tested. Specifically, in the method of the present invention, a test sequence consisting of digital data (bits) is provided to an input end of the data-transmission path, an output sequence received on an output end of the data-transmission path is cross-correlated with a reference signal corresponding to the test signal or the inverted test sequence, and the number of defective bits is determined by evaluating the extreme (i.e., the maximum or minimum value having the greatest absolute value) value of the cross-correlation function thus formed.

In the German patent publication no. A1 40 12 850 ("the '850 patent"), a test sequence formed from a sequence of digital data is fed on the input end of a transmission path. Digital data having a self-correlation (i.e., auto-correlation) function which comprises a pronounced extreme value, for instance in the form of a Dirac pulse (for the definition of Dirac pulse, see Otto Mildenberger "Grundlagen der Systemtheorie für Nachrichtentechniker" {Principles of System Theory for Communication Engineers}, Hansa-Verlag, 1981, pages 48–50) are preferably used as the test sequence. In the method of the '850 patent, an output sequence is received at the output end of the transmission path based on the test sequence transmitted. To form a cross-correlation function, the output sequence is cyclically cross-correlated, bit-wise over its length, with a reference sequence which corresponds to the test sequence or the inverted test sequence. The term "inverted test sequence" refers to a sequence which consists, in each case, of the complementary digital data of the test sequence.

The magnitude of the extreme value (i.e., the maximum or minimum) of the cross-correlation function is evaluated to determine the defectively transmitted data (number of defective bits). Fundamentally, an inverse relationship exists between the absolute amount of the extreme value and the number of defective bits within a relatively wide range.

In the method of the '850 patent, to indicate the number of defective bits, the extreme value must be subjected to further arithmetic operations, in the form of a subtraction and a division. If, for instance, a binary sequence of numbers in the form of a $2^5$-m sequence $$C_o(n) = 0000100101100111110001101110101 \quad \text{(Equation 1)}$$

with a period of N=31 is used as a test sequence and a reference sequence after converting the sequence, by translating the binary values 0 and 1 to the bipolar values −1 and +1, into a bipolar numerical sequence of the form $$C_{obi}(n) = \begin{array}{l}(-1)(-1)(-1)(-1)(+1)(-1)(-1)(+1)(+1)(-1)\\(-1)(+1)(+1)(+1)(+1)(+1)(-1)(-1)(-1)(+1)(+1)\\(-1)(+1)(+1)(+1)(-1)(+1)(-1)(+1)\end{array} \quad \text{(Equation 2)}$$

Further, if an output sequence $h_{bi}$ is falsified, for instance, in one place (bit position), the cross-correlation function (KKF(n)⁻) is formed in accordance with the equation $$KKF(n) = \sum_{m=0}^{30} C_{obi}(m) \cdot h_{bi}(n+m) \quad \text{(Equation 3)}$$

Thus, with the method of the '850 patent, an extreme value $KKF_{Ext}$ of 29 is obtained. To indicate the number of defective bits BF based on the extreme value $KKF_{Ext}$, the following arithmetic operations are necessary $$BF = (N-KKF_{Ext})/2 = (31-29)/2 = 1 \quad \text{(Equation 4)}$$

These arithmetic operations, which are necessary for indicating the number of defective bits, require a considerable circuit expenditure since they cannot be realized by simple gate circuits. The required arithmetic operations reduce of the speed of the operation of the method of the '850 patent.

The object of the present invention is to provide a method for determining the number of defective digital data transmitted over a data-transmission path to be tested having a high process speed and a simple way of indicating the number of defective bits ascertained.

SUMMARY OF THE INVENTION

In accordance with the method of the present invention, this object is achieved by cross-correlating the output sequence with the reference sequence by, in each case, an exclusive-OR function followed by check-sum formation with the formation of binary cross-correlation in accordance with the equation:

$$KKF_d(n) = \sum_{m=0}^{N-1} f(m) \oplus h(n+m)$$

in which
  $0 \leq n \leq N-1$
with:
  $\oplus$ is exclusive-OR operation;
  f(m) is reference sequence R; $\overline{R}$
  h(n+m) is output sequence AS
  N is number of bits in the test sequence A
  n is number of bit positions by which the output sequence is displaced relative to the original output sequence,
The number of defective bits is indicated directly by the low-order positions of the extreme value of the binary cross-correlation function.

To obtain a general electric signal, it is known from the German patent publication no. A1 40 14 767 ("the '767 patent") to enter a first binary unipolar data stream into a first register, to enter a second binary unipolar data stream into a second register, and to Combine the data in memory places associated with each other of the two registers with each other by an exclusive-OR function. The intermediate data, resulting simultaneously from the corresponding logic operations, are summed with the formation of one of the binary cross-correlation functions between the two entering binary data streams. The summation device used for this can consist of a cascade-like structure of several adders.

The method of the present invention advantageously uses the binary correlation function thereby eliminating the need for a subtraction of the extreme value and a division to indicate the number of defective bits. The binary cross-correlation function has a positive value region which permits (possibly after the inversion of the extreme value) a direct indication of the bit defects via the low-order positions of the extreme value.

The method of the present invention can rapidly indicate the number of defective bits and can therefore be used in real-time measurements. The number of low-order positions of the extreme value, which can still be used for dependably indicating the number of defective bits, is determined fundamentally based on the number of defective bits with which the binary cross-correlation function still has a dependably recognizable extreme value (error tolerance). The error tolerance is specific to the test sequence. With test sequences having a pronounced self-correlation function extreme value, the error tolerance reaches comparatively high values. Thus, the error distribution within the output sequence is advantageously without importance. Threshold values specific to the test sequence are preferably provided, so that a value of the binary cross-correlation function lying above the threshold value can be reliably recognized as extreme value.

One embodiment of the method of the present invention is advantageous with respect to the possibility of recognizing disturbances upon the processing of the output sequence, for instance, failure of a memory containing the reference sequence. This embodiment carries out the exclusive-OR operation, upon the formation of the binary cross-correlation function, inversely as exclusive-NOR function. Further, when the test sequence is used as reference sequence, the low-order positions of the inverted extreme value are used for indicating the number of defective bits while, when using the inverted test sequence as reference sequence, the low-order positions of the extreme value are used to directly indicate the number of defective bits. Using the inverted test sequence as reference sequence is particularly advantageous since it permits the low-order positions to be utilized without inverting the extreme value.

As will be explained in detail further with reference to FIG. 3 below, whether or not the at least the low-order positions of the extreme value are inverted, possibly before the indicating of the number of defective bits, is based on the relationship between the test sequence and the reference sequence with respect identity or inversion and on the logic operation selected (exclusive-OR operation or exclusive-NOR operation).

In a further development of the method of the present invention, a $2^n$-m sequence (see description in "Halbleiterschaltungstechnik" {Semiconductor Circuit Technology}, Tietze/Schenk, 1980, pages 509–512), a Barker code (see description in "Pulstechnik" {Pulse Engineering}, Hölzer/Holzwarth, 1982, pages 170–174), a Gordon-Mills-Welch sequence (see "Sequences", Scholz/Welch, 1984, IEEE, Vol. IT-30, No. 3, May 1984, pages 548–553) or a Gold code (see "Binary Sequence with a High Crosscorrelation with each Member of a Subset of Gold Codes", Yates, Electronics Letters, Aug. 28, 1986, Vol. 22, No. 18, pages 930 to 932) is advantageously used as a test sequence. Using such special random-number sequences as test sequences is particularly advantageous since the self-correlation (i.e., auto-correlation) function of these test sequences have extremely pronounced extreme values, approximately in the form of a Dirac pulse. Thus, the binary cross-correlation of function forms a coding method which is very tolerant of errors, i.e., it provides the largest possible indication of defective bits with a reliably recognizable extreme value of the cross-correlation function. By using long sequences, the error tolerance can be considerably increased.

In a further development of the method of the present invention, in addition to the test sequence, an inverse test sequence, formed by inverting the test sequence, is also provided at the input of the data-transmission path. Furthermore, the relative nature of the extreme value of the binary cross-correlation function is evaluated. The term "relative nature" refers to the relative position of the extreme value with respect to the rest of the course of the function.

An extreme value which lies below the other function values is referred to below as lower extreme value or minimum. An extreme value which lies above the other function values is similarly referred to below as upper extreme value or maximum. By using the inverse test sequence in addition to the test sequence, the number of test sequences (code words) available for test purposes is doubled. In this further development of the method of the present invention, which furthermore advantageously increases the reliability of the recognition of the extreme value at little expense for circuit technology, the number of defective bits can be indicated directly. For instance, the number of defective bits can be indicated by using the exclusive-NOR operation to form the binary cross-correlation function and by using the test sequence as a reference sequence in the case of a negative extreme value (minimum) via the low-order positions thereof, while in the case of a positive extreme value (maximum), the number of defective bits is indicated via the inverted low-order positions thereof.

A device for implementing the method of the present invention includes a transmitter for providing a test sequence consisting of digital data or for providing an inverse test sequence formed by inverting the digital data into a data-transmission path to be tested, a receiver for receiving an output sequence on the output end of the data-transmission path and having a correlator, acted on by the output sequence and a reference sequence on the input end, for forming a cross-correlation function. In accordance with the present invention, the correlator contains an exclusive-OR function or an exclusive-NOR function circuit behind which a summator, for forming a check-sum, is arranged. A comparator compares the check-sum with an upper threshold value and a lower threshold value, the threshold values being set at predetermined distances from value range limits which are typical for the test sequence. Based on whether or not the threshold values are exceeded by the check-sum, a selection circuit feeds at least the low-order positions of the check-sum fed, to a further processing device or a display.

The device of the present invention requires an extremely small number of circuit components to directly represent, in simple manner, the number of defective bits determined. The device of the present invention is extremely sturdy and insensitive to interference, since the output sequences received can be evaluated without an arithmetic logic unit, but rather merely by low-cost and reliably operating logical gate circuits.

BRIEF DESCRIPTION OF THE DRAWINGS

FIG. 3 shows the relationship between the extreme value of a binary cross-correlation function and a selected test sequence, a reference sequence and a logic operation.

DETAILED DESCRIPTION

The method of the present invention is described below with the use of a test sequence A which consists of a sequence of unipolar digital data (i.e., a binary sequence) in the form of a $2^5$-m sequence in accordance with Equation 1 above. The test sequence is read from, for instance, a digital storage or is generated from a feedback shift register and is then introduced, on the input end, into a data-transmission path DS to be tested. An output sequence AS, received on the output end of the data-transmission path as a result of the introduction of the binary sequence at the input end, is then correlated, in accordance with the following equation $$KKF_d(n) = \sum_{m=0}^{30} f(m) \oplus h(n+m)$$

in which
$0 \leq n \leq 30$
with:
$\oplus$ is exclusive-NOR function or exclusive-OR operation
f(m) is reference sequence R (e.g., a $2^5$-m sequence)
h(n+m) is output sequence AS with the period (number of bits in the test sequence) N=30
with a prepared reference sequence R with the formation of a binary cross-correlation function $KKF_d(n)$. The correlation is effected using an exclusive-NOR operation EXNOR or an exclusive-OR operation EXOR. The reference sequence R corresponds to the test sequence and therefore to the $2^5$-m sequence in accordance with Equation 1. However, the reference sequence R can also be inverted such that the following reference sequence results $$\overline{R}=\overline{A}= (1111011010011000001110010001010) \quad \text{(Equation 6)}$$

In the following, it is assumed that the output sequence AS received contains a single defective bit (at the 4th bit position) and thus has the binary sequence $$AS=(0001100101100111110001101110101) \quad \text{(Equation 7)}$$

Figure 1:
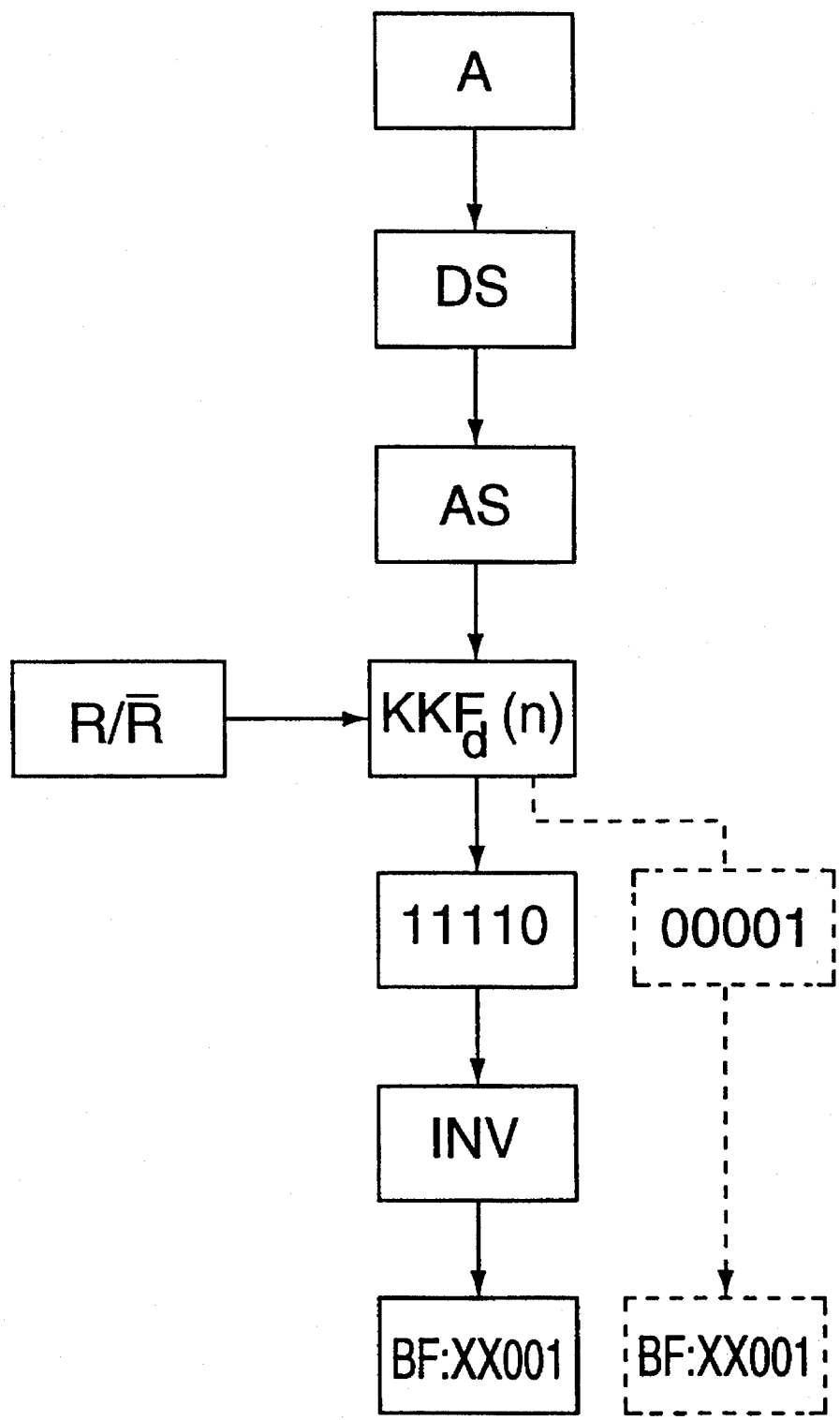
FIG. 1 is a flow chart of the method of the present invention.

The correlation function $KKF_d$, when using the reference sequence R corresponding to the test sequence A and with exclusive-NOR function EXNOR followed by check-sum formation, has an extreme value EX (maximum) of 30 (decimal) and 11110 (binary) respectively. To directly indicate the number of defective bits BF in this example, an inversion INV is required before the number of defective bits BF is represented by indication of the three low-order positions "001". Using the inverted test sequence $\overline{A}$ as reference sequence $\overline{R}$ an extreme value EX (minimum) of the binary cross-correlation function KKF of 1 (decimal) or 00001 (binary) is directly obtained, which directly represents the number of defective bits BF (shown in dashed line in FIG. 1) o When using a $2^5$-m sequence an error tolerance of up to 7 defective bits is obtained. Thus, the last three low-order positions of the extreme value EX serve preferably to represent the number of defective bits BF.

Figures 2, 4:
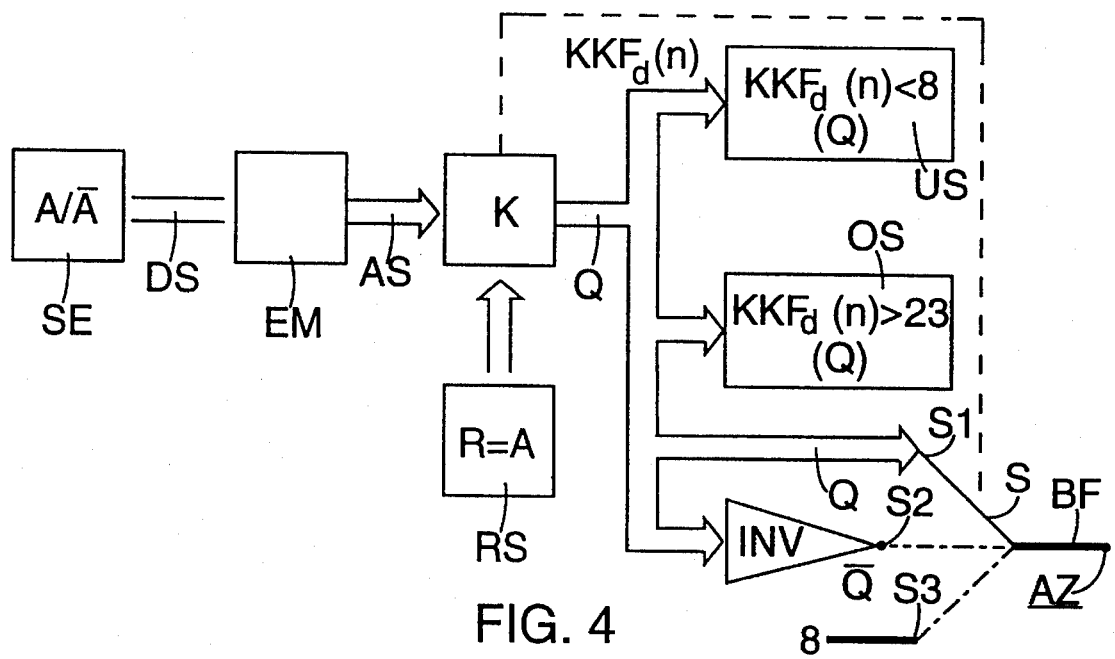
FIG. 2 is a table which indicates a number of defective bits obtained directly by the method of the present invention.
FIG. 4 is a block diagram which shows a device for implementing the method of the present invention.

Further examples of the relationship between the decimal or binary extreme value EX of the binary cross-correlations function $KKF_d$ with the number of defective bits BF are shown in the table of FIG. 2. In the upper part of the table the low-order positions of the binary cross-correlation function $KKF_d$ directly represent the number of defective bits BF. In the lower part of the table, on the other hand, as explained above, the binary value is inverted before display, at least in the region of the low-order positions of the extreme value EX of the cross-correlation function $KKF_d$.

FIG. 3 shows possible combinations, a to h, of test sequences A or $\overline{A}$ used, reference sequences R or $\overline{R}$, and the type of function and the effect thereof on the nature of the extreme value EX (maximum/minimum check-sum Q) of the binary cross-correlation function $KKF_d$ and an inversion, which is preferably to be effected. In the description of FIG. 3, the presence of a single defective bit BF is assumed. According to column a of FIG. 3, test sequence A and reference sequence R are identical. An exclusive-OR operation EXOR is selected. When a defective bit BF occurs, the cross-correlation function $KKF_d$ formed in accordance with Equation 5 between output sequence AS and reference sequence R shows a lower extreme value EX (minimum) of 1 determined by forming the check-sum Q. This value is indicated directly by outputting the low-order positions of the extreme value EX (check-sum Q).

As compared with column a, in accordance with column b, the reference sequence $\overline{R}$ consists of the inverted test sequence A used so that upon exclusive-OR operation EXOR and the check-sum Q corresponds to the maximum possible check-sum MAX reduced by 1. When using a $2^5$-m sequence, the maximum check-sum MAX in accordance with Equation 1 and Equation 5 is MAX=31. The actual check-sum Q amounts, in this case, to $$Q=MAX-1=30. \quad \text{(Equation 8)}$$

After inversion INV (see FIG. 1), the inverted low-order positions of the extreme value EX (maximum), i.e., the inverted check-sum $\overline{Q}$, is used to directly indicate the number of defective bits. The conditions upon the use of an exclusive-NOR function EXNOR are correspondingly reversed from columns a and b as shown in columns c and d of FIG. 3.

If, in addition to the test sequence A, an inverse test sequence $\overline{A}$ is also used to increase the supply of test sequences, then, in accordance with columns e to h of FIG. 3, the relationship is correspondingly reversed in each case as compared with columns a to d. If both the test sequence A and the inverse test sequence $\overline{A}$ are used when a data-transmission path DS is tested, then, as explained below, depending on the configuration with respect to the reference frequency used and the operation, the nature (maximum or minimum) of the extreme value EX can be used, if necessary, to invert at least the low-order positions of the extreme value EX before the indication.

FIG. 4 shows a device for implementing the method of the present invention in which a transmitter SE feeds both the test sequence A and the inverted test sequence $\overline{A}$ into a data-transmission path DS which is to be tested. A receiver EM, arranged on the output end of the data-transmission path DS, then receives the output sequence AS and provides it to an input of a correlator K. A second input of the correlator K is provided with a reference sequence R from a memory RS. The reference sequence R corresponds to the test sequence A. The correlator K cyclically, bit-wise over the length of the output sequence AS, cross-correlates the output sequence AS with the reference sequence R. This cross-correlation is effected, in each case, by an exclusive-NOR operation EXNOR, followed by forming the check-sum Q.

If the check-sum Q formed lies within a value range formed by a lower threshold value US=8 and an upper threshold value OS=23, then, after relative bit-wise shifting between output sequence AS and reference sequence R, the next exclusive-NOR operation EXNOR is carried out, followed by forming the check-sum.

If the check-sum Q exceeds the upper threshold value OS, a switch S is brought into a switch position S1 which sends the check-sum Q directly to a display AZ or a further processing device, for instance in the form of a memory. The display AZ shows at least the three low-order positions of the check-sum Q and thus the number of defective bits BF directly.

If the check-sum Q is less than the lower threshold value US, the switch S is brought into a switch position S2 at which the check-sum Q is fed, via an invertor INV, inverted to the display AZ.

If, after cyclic scanning of the entire output sequence AS, the check-sum Q has not exceeded either the lower threshold value US nor the upper threshold value OS, the switch S is brought into a switch position S3 by which the value 8 is fed to the display AZ. Instead of the value 8, a signal which indicates that the number of defective bits BF is exceeded can be given. In this example, the maximum number of defective bits exceeded is 7.

It is clear from FIG. 3 that when using the inverted test sequence $\overline{A}$ as reference sequence $\overline{R}$ or when using the exclusive-OR operation EXOR, the invertor INV is to be brought into the conductive path for the switch position S1, while direct indication of the check-sum Q takes place in the switch position S2.

By the method and/or device of the present invention, a binary cross-correlation function $KKF_d$, between the output sequence AS and a reference sequence R, can be formed and evaluated extremely simply and very rapidly. The method of the present invention is therefore excellently suited for testing digital transmission paths in real time.

I claim:

1. A method for determining a number of defective digital data bits transmitted over a data-transmission path to be tested, the method comprising steps of:
    a) providing a test sequence of digital data at an input side of the data-transmission path;
    b) sending the test sequence of digital data over the data-transmission path;
    c) receiving, at an output side of the data-transmission path, the test sequence sent in step (b);
    d) cross-correlating the test sequence received in step (c) with a reference sequence, said reference sequence corresponding to at least one of the test sequence and an inverted test sequence, the inverted test sequence being formed by inverting the test sequence, the step of cross-correlating including sub-steps of:
        i) performing a bit-by-bit exclusive-OR operation on the test sequence received in step (c) and said reference sequence, and
        ii) forming a check-sum with the formation of a binary cross-correlation function $KKF_d(n)$ in accordance with the following relationship:

$$KKF_d(n) = \sum_{m=0}^{N-1} f(m) \oplus h(n+m)$$

in which:

$0 \leq n \leq N-1$ with:
$\oplus$ being an Exclusive-OR function,
f(m) being a reference sequence,
h(n+m) being an output sequence, N being the number of bits in the test sequence, and
n being the number of bit positions by which the output sequence is shifted relative to the original output sequence; and
    e) indicating the number of defective digital bits based on low-order positions of extreme values of the binary cross-correlation function.

2. The method of claim 1 further comprising steps of:
    performing an exclusive-NOR operation upon the formation of the binary cross-correlation function $KKF_d$; and
    if the reference sequence is the test sequence, then inverting the extreme value and using low-order positions of the inverted extreme value to indicate the number of defective bits, and if the reference sequence is the inverted test sequence, then using the low-order positions of the extreme value to indicate the number of defective bits.

3. The method of claim 1 wherein said test sequence is selected from a group consisting of a $2^n$-m sequence, a Barker code, a Gordon-Mills-Welch sequence, and a Gold code.

4. The method of claim 1 further comprising steps of:
    sending an inverse test sequence, in addition to the test sequence, over the data-transmission path, wherein the inverse test sequence is formed by inverting the test sequence; and
    evaluating whether the extreme value is a minimum or a maximum.

5. A device for determining a number of defective digital data bits transmitted over a data-transmission path to be tested, the device comprising:
    a) a transmitter for sending one of a test sequence of digital data and an inverse test sequence over the data-transmission path to be tested;
    b) a receiver for receiving an output sequence on an output end of the data-transmission path to be tested;
    c) a cross-correlator for forming a cross-correlation of the output sequence received by the receiver and a reference sequence, said correlator including at least one of an exclusive-OR and an exclusive-NOR logical operation circuit;
    d) a summator, arranged behind, and coupled with, the logical operation circuit, for forming a check-sum;
    e) a comparator, arranged behind, and coupled with, the summator, for comparing the check-sum formed by the summator with an upper threshold value and with a lower threshold value, each of the upper and lower threshold values being set at a predetermined distance from value range limits based on the test sequence; and
    f) a selection circuit, arranged behind, and coupled with, the comparator and the summator, for feeding an indication of the number of defective digital data bits transmitted over the data-transmission path as at least low-order positions of the checksum from the summator.

* * * * *